US006954208B2

United States Patent
Doyle et al.

(10) Patent No.: US 6,954,208 B2
(45) Date of Patent: *Oct. 11, 2005

(54) DEPTH WRITE DISABLE FOR RENDERING

(75) Inventors: Peter L. Doyle, El Dorado Hills, CA (US); Aditya Sreenivas, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/844,094

(22) Filed: May 11, 2004

(65) Prior Publication Data

US 2004/0257373 A1 Dec. 23, 2004

Related U.S. Application Data

(63) Continuation of application No. 10/038,814, filed on Dec. 31, 2001, now Pat. No. 6,747,657.

(51) Int. Cl.$^7$ .............................................. G06F 13/00
(52) U.S. Cl. ...................................... 345/537; 345/422
(58) Field of Search ................................ 345/418, 419, 345/422, 501, 530, 531, 557, 559, 536–538; 711/118

(56) References Cited

U.S. PATENT DOCUMENTS

| 5,493,637 | A | 2/1996 | Martin |
|---|---|---|---|
| 5,561,780 | A | 10/1996 | Glew et al. |
| 5,760,780 | A | 6/1998 | Larson et al. |
| 6,212,605 | B1 | 4/2001 | Arimilli et al. |
| 6,393,522 | B1 | 5/2002 | Campbell |
| 6,492,991 | B1 | 12/2002 | Morein et al. |
| 6,498,606 | B1 | 12/2002 | Penna et al. |
| 6,591,347 | B2 | 7/2003 | Tischler et al. |
| 6,747,657 | B2 * | 6/2004 | Doyle et al. ................ 345/537 |

FOREIGN PATENT DOCUMENTS

| EP | 1 074 945 A2 | 8/2000 |
|---|---|---|
| WO | WO 01/01351 A1 | 1/2001 |

* cited by examiner

Primary Examiner—Kee M. Tung
(74) Attorney, Agent, or Firm—Sharon Wong

(57) ABSTRACT

A depth write disable apparatus and method for controlling evictions, such as depth values, from a depth cache to a corresponding depth buffer in a zone rendering system. When the depth write disable circuitry is enabled, evictions from the depth cache (as which typically occur during the rendering of the next zone) to the depth buffer are prevented. In particular, once the depth buffer is initialized (i.e. cleared) to a constant value at the beginning of a scene, the depth buffer does not need to be read. The depth cache handles intermediate depth reads and writes within each zone. Since the memory resident depth buffer is not required after a scene is rendered, it never needs to be written. The final depth values for a zone can thus be discarded (i.e., rather than written to the depth buffer) after each zone is rendering.

13 Claims, 5 Drawing Sheets

DEPTH WRITE DISABLE FOR RENDERING

This application is a continuation of Ser. No. 10/038,814, filed on Dec. 31, 2001, now U.S. Pat. No. 6,747,657 entitled "Depth Write Disable for Zone Rendering."

BACKGROUND

1. Field

The present invention relates generally to graphics systems and more particularly to methods and apparatus for controlling the transfer of data from a depth cache to depth buffer.

2. Background Information

Computer graphics systems are commonly used for displaying graphical representations of objects on a two-dimensional video display screen. Current computer graphics systems provide highly detailed representations and are used in a variety of applications. In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render or draw the graphics primitives that represent a view of one or more objects being represented on the display screen.

The primitives of the three-dimensional objects to be rendered are defined by a host computer in terms of primitive data. For example, when the primitive is a triangle, the host computer may define the primitive in terms of X, Y and Z coordinates of its vertices, as well as the red, green and blue (R, G and B) color values of each vertex. Additional primitive data may be used in specific applications.

Image rendering is the conversion of a high-level object-based description into a graphical image for display on some display device. For example, an act of image rendering occurs during the conversion of a mathematical model of a three-dimensional object or scene into a bitmap image. Another example of image rendering is converting an HTML document into an image for display on a computer monitor. Typically, a hardware device referred to as a graphics-rendering engine performs these graphics processing tasks. Graphics-rendering engines typically render scenes into a memory buffer that is subsequently output to the graphical output device, but it is possible for some rendering-engines to write their two-dimensional output directly to the output device. The graphics-rendering engine interpolates the primitive data to compute the display screen pixels that represent the each primitive, and the R, G and B color values of each pixel.

A graphics-rendering system (or subsystem), as used herein, refers to all of the levels of processing between an application program and a graphical output device. A graphics engine can provide for one or more modes of rendering, including zone rendering. Zone rendering attempts to increase overall 3D rendering performance by employing a zone-sized color and depth cache, also called a render cache. By gaining optimal render cache utilization, pixel color and depth memory read/write bottlenecks are thereby reduced.

In zone rendering, a screen is subdivided into an array of zones. Per-zone instruction bins, used to hold the primitive and state setting instructions required to render each zone sub-image, are generated in a first pass. Whenever it is determined that a primitive intersects (or possibly intersects) a zone, a corresponding primitive instruction is placed in the bin for that zone. Some primitives will intersect more than one zone, in which case the primitive instruction is replicated in the corresponding bins. This process is continued until the entire scene is sorted into the bins. Following the first pass of generating the bins for each zone of the image, a second zone-by-zone rendering pass is performed. In particular, the bins for all the zones are rendered to generate the final image. Each scene is typically rendered one zone at a time.

The size of the zone typically corresponds to the size and organization of the render cache. A render cache stores pixel data that have been recently used by the rendering processor so that this information is more rapidly available to the rendering processor than it is from external memory devices. In particular, the render cache handles intermediate depth reads and writes within each zone. The data is typically written from the render cache into the depth buffer in main memory. For example, depth values are evicted from the render cache to the depth buffer as a result of a context switch or the partial rendering and/or resumption of a scene. Evictions from the render cache to the depth buffer typically occur during rendering of the next zone. However, since the render cache handles intermediate reads and writes, the values evicted from the render cache to the depth buffer do not typically need to be read. Writing values to the depth buffer unnecessarily places substantial load on the memory bus as well as other parts of the system and may slow the operation of the system.

What is needed therefore is a method, apparatus and system for enabling and/or disabling evictions from a depth cache to a corresponding depth buffer.

DETAILED DESCRIPTION

Figure 1:
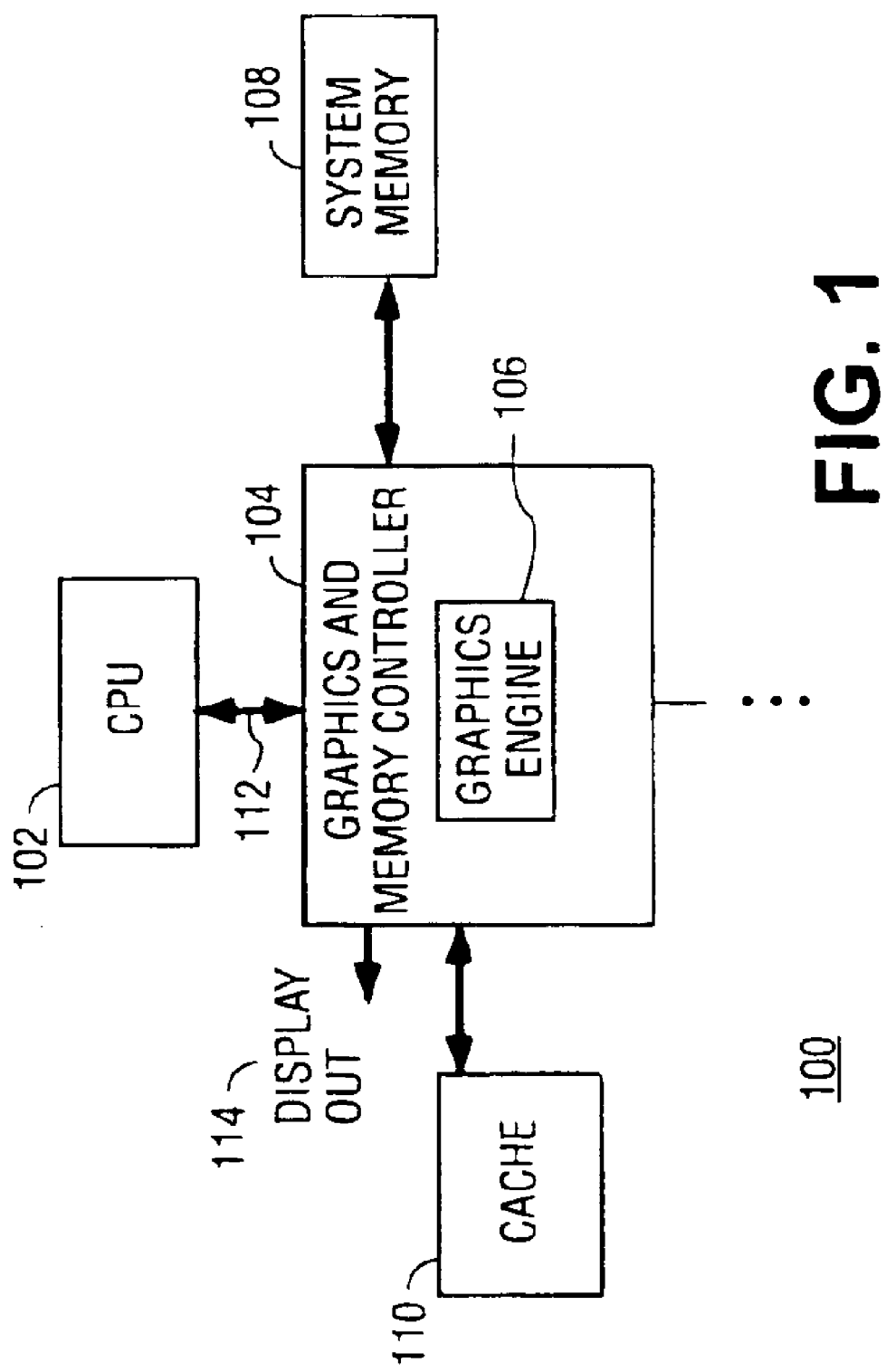
FIG. 1 illustrates a block diagram of an embodiment of a computer system including an embodiment of a graphics device for depth write disable for zone rendering.

The present invention provides a depth write disable apparatus and method for controlling evictions, such as depth values, from a depth cache to a corresponding memory-resident depth buffer in a zone rendering system. The depth write disable configuration includes a memory controller 182 implementing eviction detection logic 176 to enable/disable write evictions from the internal render cache 172 to the corresponding depth buffer 174 in response to a control signal in the form of a enable/disable bit 178. When the depth write enable/disable bit indicates that depth buffer writes are disabled, evictions 180 from the render cache 172 (as typically occur during the rendering of the next zone 164) cause the evicted data to be discarded instead of being written to the depth buffer 174. In particular, as the depth cache is initialized (i.e. cleared) to a constant value at the beginning of the rendering of a zone, the depth buffer does not need to be read. The depth cache handles intermediate depth reads and writes within each zone.

Since the memory resident depth buffer is typically not required after a scene is rendered, depth values typically do not need to be written to the depth buffer. After a scene is rendered, the final depth values for a zone can thus be discarded, rather than written to the depth buffer. The elimination of the final depth value writes to the depth buffer reduces overall bandwidth requirements, thus improving performance particularly in bandwidth-constrained systems. Embodiments of the present invention also provide for automatic override of the depth write disable configuration when evictions from the depth cache to the depth buffer are necessary.

One skilled in the art will recognize that the present invention is not limited to 3D rendering, primitives or so forth. Rather, the actual implementation may be utilized on 3D, 2_D, 2D primitives and so forth. The present invention can be utilized to prevent writes of any temporary data from a cache to a buffer where the data in at least some instances is not required after the zone is rendered. Moreover, the rendering modes may include but are not limited to solely "zone rendering." Embodiments of the present invention can also be adopted for use in non-zone rendering implementations where primitives are typically rendered all over the screen. In such an implementation, the size of the cache would be sized according to the size of the image.

In the detailed description, numerous specific details are set forth in order to provide a thorough understanding of the present invention. However, it will be understood by those skilled in the art that the present invention may be practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 1. Sample system 100 may be used, for example, to execute the processing for methods in accordance with the present invention, such as the embodiment described herein. Sample system 100 is representative of processing systems based on the microprocessors available from Intel Corporation, although other systems (including personal computers (PCs) having other microprocessors, engineering workstations, set-top boxes and the like) may also be used. In one embodiment, sample system 100 may be executing a version of the WINDOWS.™. operating system available from Microsoft Corporation, although other operating systems and graphical user interfaces, for example, may also be used.

FIG. 1 is a block diagram of a system 100 of one embodiment of the present invention. The computer system 100 includes central processor 102, graphics and memory controller 104 including graphics device 106, memory 108 and display device 114. Processor 102 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Processor 102 may be coupled to common bus 112 that transmits data signals between processor 102 and other components in the system 100. FIG. 1 is for illustrative purposes only. The present invention can also be utilized in a configuration including a descrete graphics device.

Processor 102 issues signals over common bus 112 for communicating with memory 108 or graphics and memory controller 104 in order to manipulate data as described herein. Processor 102 issues such signals in response to software instructions that it obtains from memory 108. Memory 108 may be a dynamic random access memory (DRAM) device, a static random access memory (SRAM) device, or other memory device. Memory 108 may store instructions and/or data represented by data signals that may be executed by processor 102, graphics device 106 or some other device. The instructions and/or data may comprise code for performing any and/or all of the techniques of the present invention. Memory 108 may also contain software and/or data. In some embodiments, graphics device 106 can offload from processor 102 many of the memory-intensive tasks required for rendering an image. Graphics device 106 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Graphics device 106 may be coupled to common bus 112 that transmits data signals between graphics device 106 and other components in the system 100, including render cache 110 and display device 114. As discussed in detail below, render cache 110 handles intermediate reads and writes for zone rendering. Graphics device 106 includes rendering hardware that among other things writes specific attributes (e.g. colors) to specific pixels of display 114 and draw complicated primitives on display device 114. Graphics and memory controller 104 communicates with display device 114 for displaying images rendered or otherwise processed by a graphics controller 104. Display device 114 may comprise a computer monitor, television set, flat panel display or other suitable display device.

Memory 108 stores a host operating system that may include one or more rendering programs to build the images of graphics primitives for display. System 100 includes graphics device 106, such as a graphics accelerator that uses customized hardware logic device or a co-processor to improve the performance of rendering at least some portion of the graphics primitives otherwise handled by host rendering programs. The host operating system program and its host graphics application program interface (API) control the graphics device 106 through a driver program.

Figure 2:
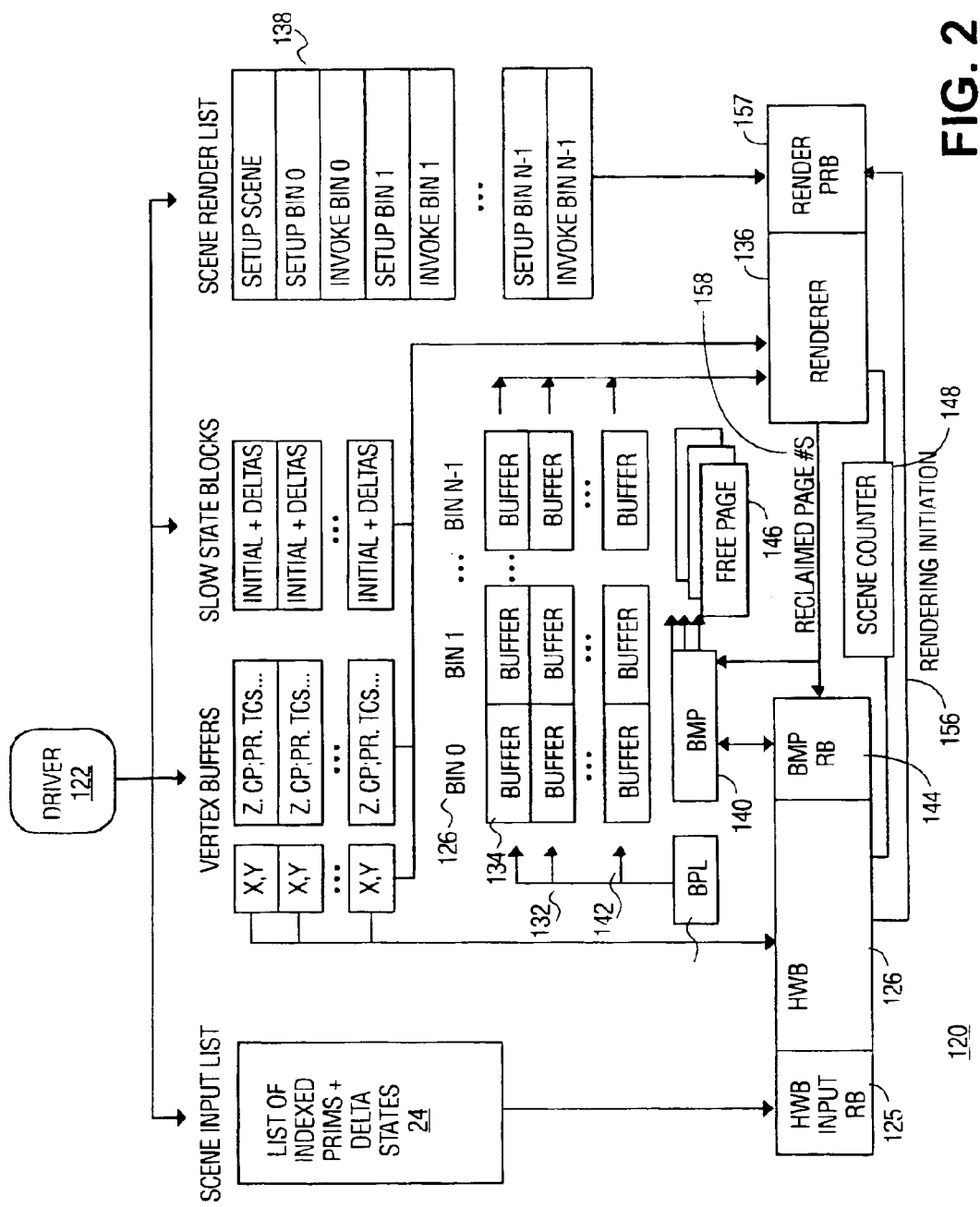
FIG. 2 illustrates a block diagram of an embodiment of a graphics device including a graphics-binning engine and graphics-rendering engine.
Figure 3:
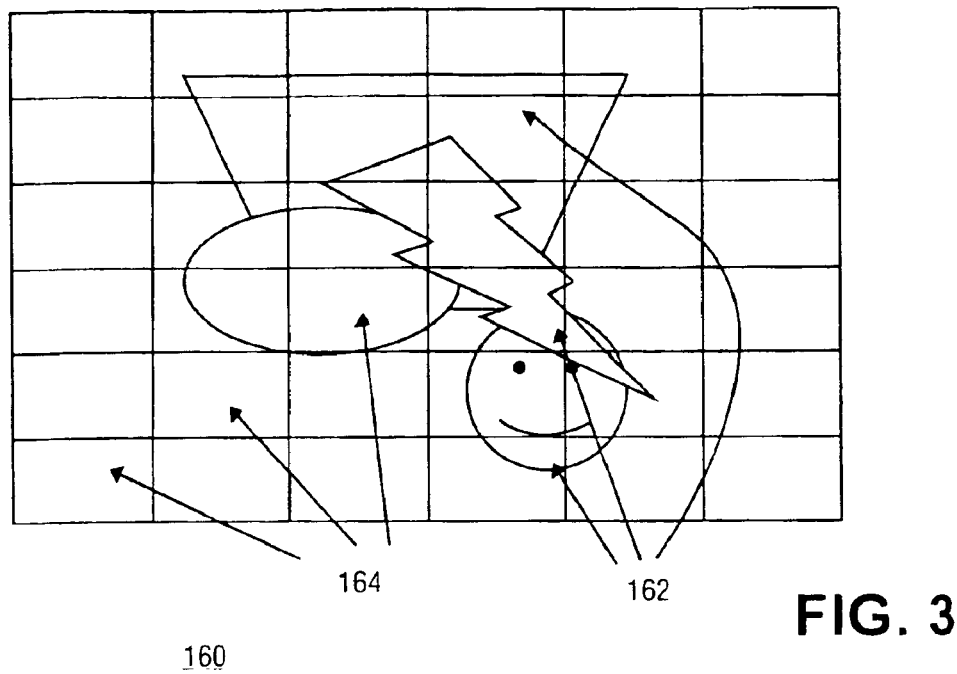
FIG. 3 illustrates a depiction of an embodiment of a zone renderer screen view including zones and geometrical primitives.

Referring to FIGS. 2 and 3, an embodiment 160 of various graphics objects, for example geometric primitives (i.e. triangles, lines) 162, implemented on a zone rendering system 120 is illustrated. In zone rendering, a screen is subdivided into an array of zones 164 commonly screen-space rectangles although other geometric variants may be used as well. Each zone 164 is associated with a bin. Each bin 128 includes a chained series of command buffers 134 stored within non-contiguous physical memory pages. The bins 128 are thus preferably implemented as a chain of independent physical pages.

The process of assigning primitives (and their attributes) 162 to zones 164 is referred to as binning. "Bin"128 refers to the abstract buffer used for each zone—where a bin 128 will typically be realized as a series of instruction batch buffers 134. Binning performs the necessary computations to determine what primitives 162 lie in what zones 164 and can be performed by dedicated hardware and/or software implementations.

When a primitive 162 intersects a zone 164, the corresponding primitive instruction is placed in the bin 128 associated with the zone 164 intersected. Per-zone instruction bins 128 are thus used to hold primitive instructions and state-setting instructions required to render each sub-image and are generated by comparing the screen-space extent of each primitive 162 to the array of zones 164. Thus, as the primitives 162 are received, the present invention determines which zone(s) 164 each primitive 162 intersects, and replicates the primitive instructions into a bin 128 associated with each of these zones 164.

In one typical implementation, a driver 122 writes out a set of primitive instructions to be parsed by the graphics-binning engine 126. For each zone 164 intersected by a primitive 162, the graphics-binning engine writes corresponding primitive instructions into buffers 134 associated with the zones 164 intersected. Some primitives 162 will intersect more than one zone 164, in which case the primitive instruction is replicated in bins 128 corresponding to the intersected zones 164. For example, the lightning bolt depicted in FIG. 3 intersects nine zones 164. This process is continued until the entire scene is sorted into bins 128.

Referring to FIG. 2, in a typical implementation, a graphics primitive and state-setting instruction stream, referred to as a scene input list 124, is initially applied to graphics-binning engine ring buffer 125 associated with graphics-binning engine 126. The scene input list 124 may be a single, temporally-ordered scene description as received by the application programming interface (API). Graphics-binning engine 126 is typically implemented as a hardware binning engine (HWB) 126. One skilled in the art will recognize that a software or software plus hardware binner could be used as well. The graphics-binning engine 126 parses scene input list 124 and determines which zone(s) 164 each primitive 162 intersects.

As previously noted, the zones 164 are associated with bins 128. Graphics-binning engine 126 compares the screen-space extent of each primitive 162 to the array of zones 164, and replicates the associated primitive commands into corresponding bins 128. Bins 128 are comprised of chained series of command buffers 134 typically stored within non-contiguous physical memory pages. A bin list is a list of buffers 134 which comprise each bin 132. Pages are initially allocated to the bin memory pool (BMP) 140. The bin pointer list 130 is initialized with the page numbers of the pages and stores write pointers into each bin list 132.

The graphics-binning engine 126 also maintains the current graphics state by parsing associated state-setting instructions contained with the scene input list 124. Prior to placing a primitive command in any given bin 128, the graphics-binning engine 126 typically precedes the primitive command in the bin 128 with any required state-setting instructions.

After the scene input list 124 has been completely parsed, the associated bins (i.e. bin 0, bin 1 . . . bin n−1) are ready to be used by the graphics-rendering engine 136 to render the scene. As discussed in detail below, instructions are included at the end of the scene input list 124 to cause the graphics-binning engine 126 to increment the register in pending scene counter 148 by one and initiate rendering of the binned scene. For example, graphics-binning engine 126 sends a render instruction to graphics-rendering engine ring buffer 157 associated with graphics-rendering engine 136 via path 156.

Rendering

Once all the primitives 162 are sorted and the command structures completed, a second pass is made to render the scene one zone 164 at a time. Following the first pass of building a bin for each zone 164 intersected by a primitive 162, a second zone-by-zone rendering pass is performed. In particular, the bins 128 for all the zones 164 are rendered to generate the final image, with each scene rendered one zone 164 at a time. The order with which the zones 164 are rendered is typically not significant. All bins 128 associated with primitives 162 that touch pixels within a particular zone 164 are rendered before the next zone 164 is rendered. A single primitive 162 may intersect many zones 164, thus requiring multiple replications. As a result, primitives 162 that intersect multiple zones 164 are rendered multiple times (i.e. once for each zone 164 intersected).

Figure 4:
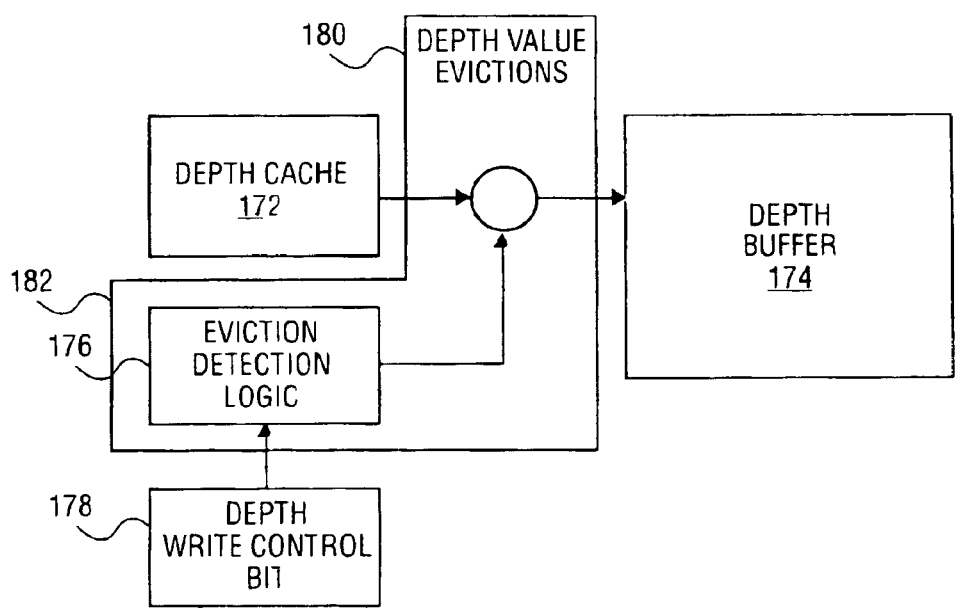
FIG. 4 illustrates a block diagram of an embodiment of a depth write disable system.

Referring to FIGS. 3 and 4, rendering performance improves as a result of the primitives 162 being sorted by their intersections with zones 164 that are aligned to the render cache 172. The information is stored in the depth cache 172 with its memory address where it is available for later use by the rendering engine 136. Since graphics device 106 only works on a small portion of the screen at a time (i.e. a zone 164), it is able to hold the frame buffer contents for the entire zone 164 in render cache 172. A render cache 172 handles intermediate depth reads and writes within each zone 164. The dimensions of the zone 164 are typically a constant tuned to the size and organization of the render cache 172. It is by this mechanism that the render cache 172 provides optimal benefits—reuse of cached data is maximized by exploiting the spatial coherence of a zone 164. With zone rendering, only the minimum number of color memory writes need be performed to generate the final image one zone 164 at a time, and color memory reads and depth memory reads and writes can be minimized or avoided altogether. Use of the render cache 172 thus significantly reduces the memory traffic and improves performance relative to a conventional renderer that draws each primitive 162 completely before continuing to the next primitive 162. Consequently, whenever the memory resident depth buffer 174 is not required after a scene is rendered, the final depth values for a zone 164 stored in the render cache 172 can be discarded, rather than written to the depth buffer 174.

FIG. 4 illustrates a block diagram of an embodiment 170 of a depth write disable configuration. The depth write disable configuration includes a memory controller 182 implementing eviction detection logic 176 to enable/disable write evictions from the internal render cache 172 to the corresponding depth buffer 174 in response to a control signal in the form of a enable/disable bit 178. When the depth write enable/disable bit indicates that depth buffer writes are disabled, evictions 180 from the render cache 172 (as typically occur during the rendering of the next zone 164) cause the evicted data to be discarded instead of being written to the depth buffer 174. The elimination of the final depth value writes reduces overall bandwidth requirements and therefore improves performance, especially in bandwidth-constrained system configurations.

When the depth write enable/disable bit indicates that depth buffer writes are enabled, the memory controller 182 performs a write back cycle. When the memory controller 182 releases the bus, the rendering processor writes the cache data on the memory bus. This data reaches the depth buffer 174.

Figure 5:
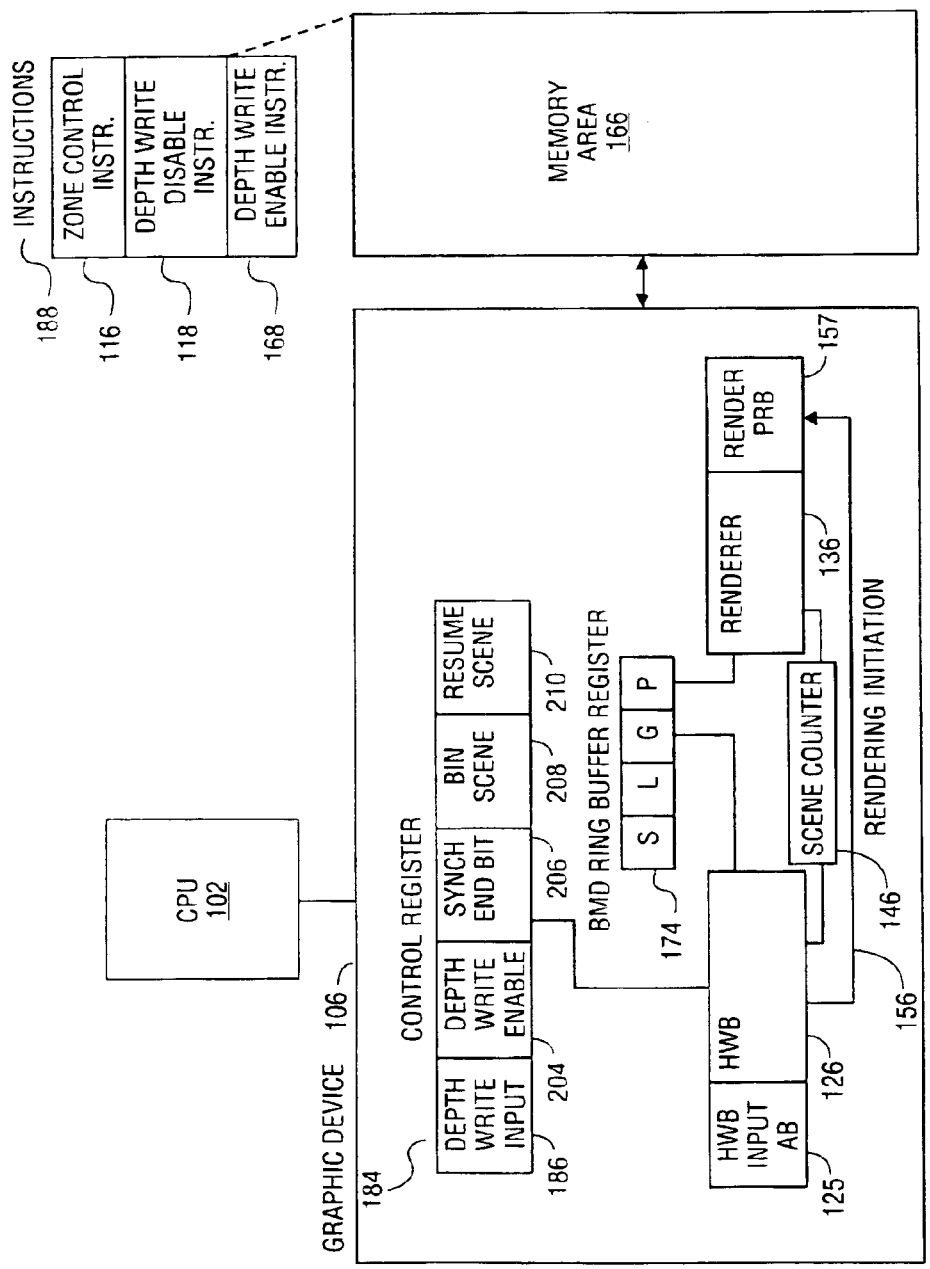
FIG. 5 illustrates a detailed block diagram of an embodiment of a computer system including a central processing unit, a memory, and a graphics device having an embodiment of a depth write disable device.

FIG. 5 illustrates a detailed block diagram of a depth cache 172, depth buffer memory area 174, and graphics device 106 including a graphics binning engine 126, graphics rendering engine 136 and zone control register 182. Depth buffer memory area 174 is a two-dimensional surface usually used to store per-pixel depth and stencil values for use by the graphics-binning engine 126 and graphics-rendering engine 136. The depth cache 172 corresponding to depth buffer memory area 174 holds color and depth values in the zone rendering mode. When the "depth write disable" feature is enabled, it prevents depth cache evictions from being written to the depth buffer. The "depth write enable" feature may be implemented by a bit to enable/disable the writing of depth values to the depth buffer regardless of depth buffer format.

Referring to FIGS. 4 and 5, zone control register 184 includes multiple fields including a depth write disable field 186 for storing depth write control signals 178, typically implemented as one or more bit(s). Memory controller 182 uses depth write control bits 178 to determine whether evictions from the depth cache 172 should be written to depth buffer 174. In an embodiment, the zone control register 184 implements depth write control bits such as depth write disable bit 178.

In operation, a graphics application (not shown) supplies instructions 188, including zone control instructions 116, into the instruction stream. The instructions 188 are stored in a memory area 166 and accessible to graphics-binning engine 126 and graphics-rendering engine 136 which decode and execute them. During the zone rendering mode, zone control register 184 is made to be the active register during the processing of zone control instruction 116 from the instruction stream.

In a typical implementation, depth write disable control instruction 118 provides a depth write control value 178 (local control address+depth write disable bit) that is loaded into zone control register 184. A depth write disable field 186 allows graphics application software or operating software to request depth write disable to be enabled so that normal evictions 180 from depth cache 172 to depth buffer 174 are prevented. In particular, in the binning stage, primitives 162 are decomposed into zones 164 that are aligned to depth cache 172. Since graphics device 106 only works on a small portion of the screen at a time i.e. a zone 164, it is able to hold the frame buffer contents for the entire zone 164 in depth cache 172. Only the minimum number of color memory writes need to be performed to generate the final image one zone at a time, and color memory reads and depth memory reads and writes to depth buffer 174 can be minimized or avoided altogether. A (constant) clear depth value can be generated and written to depth buffer 174. Similarly, a (constant) clear stencil value is written to depth buffer 174. A special primitive can also be used to perform a fast clear of the depth or any other memory areas. When depth write disable bit 178 of zone control register 184 is set, the depth eviction detection logic 176 prevents depth value writes 180 to depth buffer 174.

Embodiments of the present invention also provide for automatic override of depth write disable configuration 170 when evictions from depth cache 172 to depth buffer 174 are necessary. Depth write enable control instruction 168 provides a depth write control value (local control address and depth write enable bit) 178 that is loaded into zone control register 182. Depth write enable field 204 allows graphics application software or operating software to request depth write to be enabled so that evictions 180 from depth cache 172 to depth buffer 174 are allowed to be written.

Evictions from depth cache 172 written to depth buffer 174 may be desirable in various situations and is not limited to any of the configurations discussed herein. For example, depth cache 172 may need to write data back to depth buffer 174 in multiple context applications, when rendering partially binned scenes, when the cache is flushed, when a valid cache line is deallocated to provide space for a line of new data in the cache, or when the only valid copy of data is in the cache and the graphics engine 106 wants to use, or partially overwrite, that data. In each of these cases, the only valid copy of data may be in depth cache 172 so that a write to memory is required to assure that the data in memory is not stale.

For example, depth write control circuit can be used with a system and method for rendering multiple images on multiple display devices using a graphics-rendering engine 136. Graphics-rendering engine 136 may alternate between the processing of instructions associated with a first independent image and instructions associated with a second independent image. In particular, graphics-rendering engine 136 may switch between processing instructions from different ring buffer memory areas or by processing instruction from two different graphics applications within the same instruction stream. Graphics-rendering engine 136 need not wait to completely process all of the instructions associated with the first independent image before starting to process instructions associated with the second independent image. To facilitate context switching, depth cache 172 needs to be used by another graphics context or purpose prior to the completion of rendering. In such case, depth write evictions need to be written to the appropriate graphics context's depth buffer. Previously written depth values can be read back into depth cache 172 later when necessary. Allowing such evictions permits the cached depth values 180 to be written to the appropriate graphics context's depth buffer 174.

Evictions 180 from depth cache 172 to depth buffer 174 may be desirable where a partially binned scene needs to be rendered (in order to free memory resources and/or permit intermediate access to the partial scene results) and then subsequently resumed. Zones 164 of a scene are sometimes rendered before the scene is completely binned. This situation may arise from resource (instruction, vertex or texture memory) limitations that may not allow the entire scene to be binned.

In particular, if additional free memory cannot be made, graphics rendering engine 136 renders a partially-binned scene to free up bin memory and then restarts binning the remainder of the scene. In a typical embodiment, a direct write of zone control register 184 to set a synchronous end scene bit 206 is performed. This causes graphics binning engine 126 to (a) close all valid bins 128 by terminating them with an instruction to end the batch buffer, (b) flush out any internally cached data (e.g., cached bin pointers 132), and (c) modify the state-tracking information associated with bins 128 such that, upon resumption of binning, all necessary state is inserted into a bin 128 prior to the first primitive 162 it receives. A direct write of a bin scene register 208 causes pending scene counter 148 to get incremented. The depth write enable bit 204 is cleared prior to rendering the partial scene as the rendering of the continuation of the scene will require depth values to have been written to memory. Binning of the scene is resumed through a direct write of the zone control register 184 to set a resume bit 210.

The present invention also prevents the rendering of a zone 164 from increasing latency of competing operations (e.g., dual display) and effectively eliminates hard limits on scene resources (bin list memory, texture memory, etc.).

Another typical implementation is the interruption of the rendering of a zone 164 by another ring. Here the rendering performed in the other ring (indeed, simply the logical context switch to the other ring) will force evictions from the depth cache 172. In order to resume the rendering of the zone 164, intermediate color and depth values must have been written to the memory resident buffers, such as depth buffer 174—where the depth cache 172 misses will bring the zone's color and depth value back into the depth cache 172 if subsequently required.

In yet another typical implementation, evictions 180 from the depth cache 172 due to logical context switch or flush operations are not gated by depth write disable bit 178. When zone rendering is resumed, the setting of depth write disable bit 178 is restored and will subsequently gate depth eviction (e.g. writes).

Furthermore, another embodiment attempts to gain access to the target color and/or depth buffer 174 (which have yet to be rendered). This access may come either explicitly via a lock operation or implicitly via a copy operation that reads the yet to be rendered color or depth buffer 174. In this case, the depth write disable feature is typically only used during the final phase of scene rendering.

Figure 6:
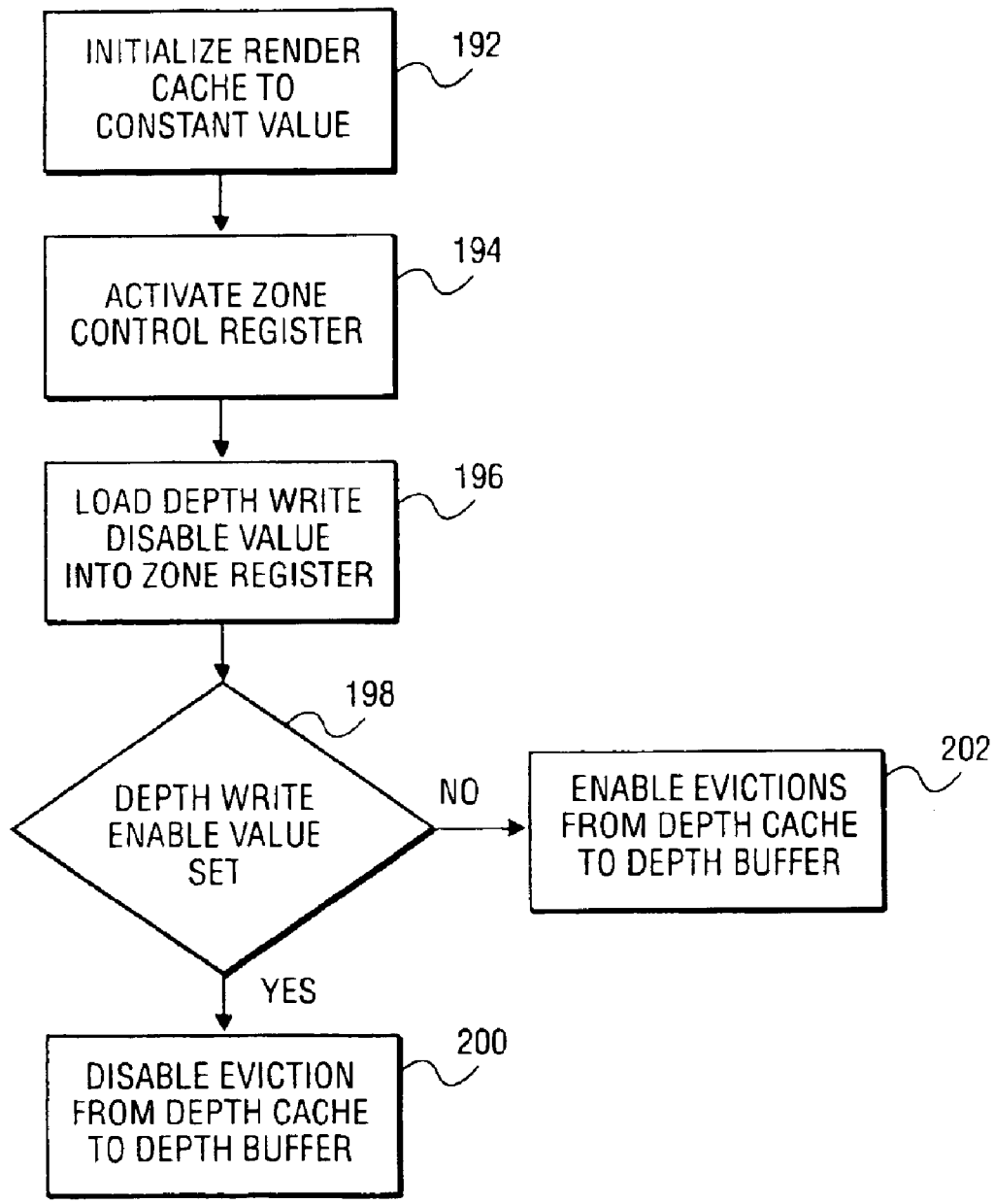
FIG. 6 illustrates a flow diagram of an embodiment of a process for enabling and/or disabling the depth write disable device.

FIG. 6 is a flow diagram of an embodiment 190 for inhibiting depth value evictions from the depth cache 172 to depth buffer 174. In zone rendering, the internal render cache 172, which typically holds color and depth values, is initialized to a constant (i.e. clear) value (step 192). If required, the (constant) clear depth value is generated and written to depth buffer 174. Similarly, if required, the (constant) clear stencil value is written to depth buffer 174. A special primitive may be used to perform a fast clear of the depth or any other buffers.

A particular zone control register is made to be the active register during the processing of a zone control instruction from the instruction stream being stored in a corresponding ring buffer memory area (step 194). In a typical implementation, the graphics applications supply instructions into the instruction stream. The graphics-rendering engine decodes specific instructions from the instruction stream to find out what information the instruction contains (for example, zone control or a state variable change to apply or a primitive to be rendered). These instructions may be stored in a ring buffer memory area that is usually associated with a particular display device. The graphics-rendering engine then executes the instruction accordingly.

In a typical implementation, the zone control instruction provides a depth write disable value (local control address+ depth write disable bits) to be loaded into the zone control register (step 196).

Whether the depth and/or other values (such as stencil values) 180 should be evicted from the render cache 172 to the depth buffer 174 is determined (step 198). For example, the embodiment 170 detects those render configurations such as zone rendering where a render or alternative cache is used to hold data and normal evictions to the depth buffer 174 are not needed. The present invention can detect whether a depth write disable value (local control address+ depth write disable bits) was loaded into the zone control register.

If no eviction is desired (i.e. the depth write disable bit 178 of a zone control register is set) (step 198), the depth eviction detection logic 176 prevents depth value writes 180 to the depth buffer 174 (step 200). In a typical implementation, a depth write disable field allows graphics application software or operating software to request depth write disable to be enabled so that evictions 180 from the render cache 172 to the depth buffer 174 are prevented.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A method for inhibiting evictions from a first to a second memory during rendering of one or more primitives, comprising:

initializing the first memory to a constant value;

providing a depth write disable value and loading a control data signal into a zone control register; and determining whether there should be evictions from the first to second memory based upon the control data signal.

2. The method of claim 1 further comprising:

inhibiting evictions from the first to second memory based upon the control data signal.

3. The method of claim 1 further comprising:

allowing evictions from the first to second memory based upon the control data signal.

4. The method of claim 2 wherein inhibiting evictions from the first to second memory based upon the control data signal further comprising:

inhibiting depth write evictions from a depth cache to a depth buffer based upon the control data signal.

5. The method of claim 3 wherein allowing evictions from the first to second memory based upon the control data signal further comprises:

allowing depth write evictions from a depth cache to a depth buffer based upon the control data signal.

6. The method of claim 1 further comprising:

automatically overriding depth write evictions when evictions from the depth cache to the depth buffer are desired.

7. The method of claim 6 wherein automatically overriding depth write evictions when evictions from the depth cache to the depth buffer are necessary further comprises:

automatically overriding depth write evictions when evictions from the depth cache to the depth buffer in response to an asynchronous graphics context switch.

8. The method of claim 1 further comprising:

inhibiting the control data signal during rendering.

9. An apparatus, comprising:

a first memory area for storing depth values, wherein the first memory is initialized to a constant value;

a second memory area; and a controller to initialize the first memory to a constant value, provide a depth write disable value and load a control data signal into a control register, and determine whether there should be evictions from the first to second memory based upon the control data signal.

10. The apparatus of claim 9 wherein the controller inhibits evictions from the first to second memory based upon the control data signal.

11. The apparatus of claim 9 wherein the controller allows evictions from the first to second memory based upon the control data signal.

12. The apparatus of claim 9 wherein the controller automatically overrides depth write evictions when evictions from the first to the second memory are desired.

13. The method of claim 12 wherein the controller automatically overrides depth write evictions when evictions from the first to the second memory are desired further comprises:

automatically overriding depth write evictions in response to an asynchronous graphics indication.

* * * * *